(12) United States Patent
Linguraru et al.

(10) Patent No.: US 10,204,260 B2
(45) Date of Patent: *Feb. 12, 2019

(54) DEVICE AND METHOD FOR CLASSIFYING A CONDITION BASED ON IMAGE ANALYSIS

(71) Applicant: Children's National Medical Center, Washington, DC (US)

(72) Inventors: Marius George Linguraru, Washington, DC (US); Qian Zhao, Hyattsville, MD (US); Kenneth Rosenbaum, Silver Spring, MD (US); Marshall Summar, Washington, DC (US); Kazunori Okada, Los Angeles, CA (US)

(73) Assignee: CHILDREN'S NATIONAL MEDICAL CENTER, Washington, DC (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/264,386

(22) Filed: Sep. 13, 2016

(65) Prior Publication Data

US 2017/0068846 A1 Mar. 9, 2017

Related U.S. Application Data

(63) Continuation of application No. 14/173,482, filed on Feb. 5, 2014, now Pat. No. 9,443,132.

(Continued)

(51) Int. Cl.
*G06K 9/00* (2006.01)

(52) U.S. Cl.
CPC ..... *G06K 9/00281* (2013.01); *G06K 9/00221* (2013.01); *G06K 9/00288* (2013.01);
(Continued)

(58) Field of Classification Search
CPC .......... G06K 9/00281; G06K 9/00335; G06K 9/00221; G06K 9/00302; G06K 9/00288
See application file for complete search history.

(56) References Cited

U.S. PATENT DOCUMENTS

| | | | |
|---|---|---|---|
| 6,024,699 A * | 2/2000 | Surwit | G06F 19/3418 600/300 |
| 2004/0017930 A1 * | 1/2004 | Kim | G06K 9/00228 382/103 |

(Continued)

OTHER PUBLICATIONS

Schneider, Harald J., et al. "A novel approach to the detection of acromegaly: accuracy of diagnosis by automatic face classification." The Journal of Clinical Endocrinology & Metabolism 96.7 (2011): 2074-2080.

(Continued)

*Primary Examiner* — Utpal D Shah
(74) *Attorney, Agent, or Firm* — Oblon, McClelland, Maier & Neustadt, L.L.P.

(57) ABSTRACT

An image analysis device includes circuitry that receives one or more input images and detects a plurality of anatomical landmarks on the one or more input images using a pre-determined face model. The circuitry extracts a plurality of geometric and local texture features based on the plurality of anatomical landmarks. The circuitry selects one or more condition-specific features from the plurality of geometric and local texture features. The circuitry classifies the one or more input images into one or more conditions based on the one or more condition-specific features.

27 Claims, 16 Drawing Sheets

Related U.S. Application Data

(60) Provisional application No. 61/760,916, filed on Feb. 5, 2013.

(52) U.S. Cl.
CPC ..... *G06K 9/00302* (2013.01); *G06K 9/00335* (2013.01); *G06K 9/00* (2013.01)

(56) References Cited

U.S. PATENT DOCUMENTS

| | | | | |
|---|---|---|---|---|
| 2007/0003137 A1* | 1/2007 | Cremers | ............ | G06K 9/6207 382/171 |
| 2007/0031003 A1* | 2/2007 | Cremers | ............ | G06K 9/6207 382/103 |
| 2008/0260212 A1* | 10/2008 | Moskal | ............ | A61B 5/1079 382/118 |
| 2009/0293119 A1* | 11/2009 | Jonsson | ............ | G06F 21/36 726/19 |
| 2012/0183238 A1* | 7/2012 | Savvides | ............ | G06K 9/00201 382/285 |
| 2013/0251244 A1* | 9/2013 | Wei | ............ | G06K 9/00281 382/159 |

OTHER PUBLICATIONS

Boehringer, Stefan, et al. "Syndrome identification based on 2D analysis software." European Journal of Human Genetics 14.10 (2006): 1082-1089.

Cristinacce, David. And Tim Cootes. "Automatic feature localization with constrained local models." Pattern Recognition 41.10 (2008): 3054-3067.

Rapp, V.: Senechal, T.; Bally, K.; Prevost, L., "Multiple kernel learning SVM and statistical validation for facial landmark detection," in Automatic Face & Gesture Recognition and Workshops (FG 2011), 2011 IEEE International Conference on, vol., No., pp. 265-271, Mar. 21-25, 2011.

Author = {Mehmet Üzümcü and Ro F. Frangi and Johan H.C. Reiber and Boudewijn P.F. Lelleveldt}, title = {Independent component analysis in statistical shape models}, booktitle = {in SPIE Medical Imaging}, year = {2003}, pp. 375-383.

Timo Ahonen and Matti Pietikäinen, "Pixelwise Local Binary Pattern Models of Faces Using Kernel Density Estimation." DOI: 10.1007/978-3-642-01793-3_6 Conference: Advances in Biometrics, Third International Conference, ICB 2009, Alghero, Italy, Jun. 2-5, 2009, Proceedings.

\* cited by examiner

DEVICE AND METHOD FOR CLASSIFYING A CONDITION BASED ON IMAGE ANALYSIS

CROSS-REFERENCE TO RELATED APPLICATIONS

This application is a continuation application of, and claims the benefit of priority under 35 U.S.C. § 120 from U.S. Pat. No. 9,443,132, issued Sep. 13, 2016, herein incorporated by reference, which claims the benefit of priority from U.S. Application Ser. No. 61/760,916, filed Feb. 5, 2013.

BACKGROUND

Technical Field

The present disclosure relates to computer-aided diagnosis in dysmorphology. Moreover, the present disclosure may also be adapted for assessment of other conditions associated with facial dysmorphosis, and generally assessing facial morphology or face recognition from basic images.

REFERENCES

The references listed below are cited in the present disclosure and are incorporated herein by reference.
[1] Aldridge, K., S. A. Boyadjiev, G. T. Capone, V. B. DeLeon and J. T. Richtsmeier (2005). "Precision and error of three-dimensional phenotypic measures acquired from 3 dMD photogrammetric images." *American Journal of Medical Genetics Part A* 138A(3): 247-253.
[2] Astley, S. J. "FAS Diagnostic and Prevention Network." from http://depts.washington.edu/fasdpn/htmls/face-software.htm.
[3] Astley, S. J. (2004). "Fetal alcohol syndrome prevention in Washington State: evidence of success." *Paediatric and Perinatal Epidemiology* 18(5): 344-351. [4] Astley, S. J. and S. K. Clarren (2001). "Measuring the facial phenotype of individuals with prenatal alcohol exposure: correlations with brain dysfunction." *Alcohol Alcohol* 36(2): 147-159.
[5] Boehringer, S., T. Vollmar, C. Tasse, R. P. Wurtz, G. Gillessen-Kaesbach, B. Horsthemke and D. Wieczorek (2006). "Syndrome identification based on 2D analysis software." *Eur J Hum Genet* 14(10): 1082-1089.
[6] Burçin, K. and N. V. Vasif (2011). "Down syndrome recognition using local binary patterns and statistical evaluation of the system." *Expert Systems with Applications* 38(7): 8690-8695.
[7] Dalal, A. B. and S. R. Phadke (2007). "Morphometric analysis of face in dysmorphology." *Computer Methods and Programs in Biomedicine* 85(2): 165-172.
[8] de Graaf, G., M. Haveman, R. Hochstenbach, J. Engelen, K. Gerssen-Schoorl, P. Poddighe, D. Smeets and G. van Hove (2011). "Changes in yearly birth prevalence rates of children with Down syndrome in the period 1986-2007 in the Netherlands." *Journal of Intellectual Disability Research* 55(5): 462-473.
[9] Hammond, P., T. J. Hutton, J. E. Allanson, L. E. Campbell, R. C. M. Hennekam, S. Holden, M. A. Patton, A. Shaw, I. K. Temple, M. Trotter, K. C. Murphy and R. M. Winter (2004). "3D analysis of facial morphology." *American Journal of Medical Genetics Part A* 126A(4): 339-348.
[10] Koutroumbas, S. T. a. K. (2006). *Pattern Recognition, Third Edition*. Orlando, Fla., USA, Academic Press, Inc.
[11] Loos, H. S., D. Wieczorek, R. P. Wurtz, C. v. d. Malsburg and B. Horsthemke (2003). "Computer-based recognition of dysmorphic faces." *European Journal of Human Genetics* 11(8): 555-560.
[12] Mutsvangwa, T. E. M E. M. Meintjes, D. L. Viljoen and T. S. Douglas (2010). "Morphometric analysis and classification of the facial phenotype associated with fetal alcohol syndrome in 5- and 12-year-old children." *American Journal of Medical Genetics Part A* 152A(1): 32-41.
[13] R. Herpers, H. R., G. Sommer (1993). *A Neural Network Identifies Faces with Morphological Syndromes*. The 4th Conference on Artificial Intelligence in Medicine, Andreassen, IOS Press.
[14] Saraydemir, Ş., N. Taşinar, O. Eroğul, H. Kayserili and N. Dinçkan (2012). "Down Syndrome Diagnosis Based on Gabor Wavelet Transform." *Journal of Medical Systems* 36(5): 3205-3213.
[15] Vollmar, T., B. Maus, R. P. Wurtz, G. Gillessen-Kaesbach, B. Horsthemke, D. Wieczorek and S. Boehringer (2008). "Impact of geometry and viewing angle on classification accuracy of 2D based analysis of dysmorphic faces." *European Journal of Medical Genetics* 51(1): 44-53.
[16] Wilamowska, K., L. Shapiro and C. Heike (2009). *Classification of 3D face shape in 22q11.2 deletion syndrome*. Biomedical Imaging: From Nano to Macro, 2009. ISBI '09. IEEE International Symposium on.
[17] Wiseman, F. K., K. A. Alford, V. L. J. Tybulewicz and E. M. C. Fisher (2009). "Down syndrome—recent progress and future prospects." *Human Molecular Genetics* 18(R1): R75-R83.

DESCRIPTION OF RELATED ART

Many syndromes present facial dysmorphosis, such as Down syndrome, Wolf-Hirschhorn syndrome, Williams-Beuren syndrome, fetal alcohol syndrome, etc. Among them, Down syndrome is the most common chromosomal abnormality and it affects one out of every 300 to 1,000 babies worldwide, depending on factors such as prenatal testing and maternal age (Wiseman, Alford et al. 2009, de Graaf, Haveman et al. 2011). It is caused by the presence of an extra copy of chromosome 21. Patients with Down syndrome have an increased risk for developmental disabilities, heart defects, respiratory and hearing problems, and the early detection of the syndrome is fundamental for managing the disease. The early diagnosis may provide the best clinical management of pediatric patients with Down syndrome for lifelong medical care that may involve physical and speech therapists, cardiologists, endocrinologists and neurologists.

Down syndrome may be diagnosed before or after birth. Biochemical screening and cytogenetic diagnostic tests can be performed prenatally. After birth, Down syndrome could be identified by the presence of certain physical traits, but this can require the expertise of a dysmorphologist. These traits include upward slanting eyes, a small and flattened nose, small ears and mouth, and protruding tongue, and chromosomal analysis may be helpful to confirm the diagnosis. These tests are costly and time-consuming, and many healthcare centers do not have ready access to this technology in a time sensitive manner.

Objective techniques for assessing facial morphology by anthropometry and photogrammetry have been investigated. Anthropometry refers to the measurement of a human individual. Photogrammetry is the practice of determining the geometric properties of objects from photographic images. Preliminary work by Herpers et al (R. Herpers 1993) investigated an artificial neural network approach to identify face images with morphological abnormalities. For this study, neither anatomical geometric information nor texture analysis was included.

More recently, two-dimensional (2D) and three-dimensional (3D) facial image analysis methods are used for syndrome detection. Wieczorek et al have been working on syndrome detection in groups and in pairs based on 2D facial image analysis. In (Loos, Wieczorek et al. 2003), five syndromes were classified from each other with 55 photographs. Gabor wavelet transformation was used to represent facial characteristics on frontal faces. Classification was implemented based on the bunch graph matching algorithm. The results proved that certain syndromes were associated with a specific facial pattern that can be described in mathematical terms. In (Boehringer, Vollmar et al. 2006), they extended the study to include ten syndromes with 147 patients. Pairwise classification was achieved by linear discriminant analysis, support vector machines and k-nearest neighbors. The classification accuracy among the ten syndromes was about the same accuracy achieved by five syndromes in the previous study.

In their most recent work (Vollmar, Maus et al. 2008, Burçin and Vasif 2011), a side-view pose was included in analysis. The number of syndromes increased from ten to fourteen. Along with Gabor wavelets, landmark coordinates were used as geometry information to recognize syndromes. The results showed improvements when combining wavelets and geometry, and frontal and side-view data. However, their method required manual pre-processing and image standardization. Moreover, they just discriminated syndromes between groups and in pairs instead of identifying syndromes from healthy population.

For Down syndrome detection, the authors in (Saraydemir, Taşpinar et al. 2012) applied a Gabor wavelet transform globally to cropped face images. Principal component analysis and linear discriminant analysis were used for feature dimension reduction. The classification accuracy achieved by k-nearest neighbor classifier and support vector machines were 96% and 97.3%, respectively. But their method also needs manual image standardization including rotation and cropping. The small dataset only consisted of 15 Down syndrome and 15 normal cases. They extract global texture features.

In (Burçin and Vasif 2011), Burçin et al separated Down syndrome from healthy group using local binary patterns (LBP) as facial features. For classification, template matching based on Euclidean distance and Changed Manhattan distance method were used. Still, manually cropping was required in pre-processing. Moreover, they applied an LBP operator on non-overlapped blocks covering the whole face.

Mutsvangwa et al investigated morphometric analysis and classification of the facial phenotype associated with fetal alcohol syndrome (FAS) in (Mutsvangwa, Meintjes et al. 2010). Procrustes analysis, regression and discriminant function analysis were applied to 3D coordinates derived from stereo-photogrammetry and facial surface imaging. Their method required a special calibration frame for image acquisition. Besides, no texture features were extracted.

Astley et al developed software to measure the magnitude of expression of the three key diagnostic facial features of FAS (short palpebral fissure length, smooth philtrum, and thin upper lip). The software scores the outcomes of these measures using the 4-Digit Diagnostic Code. To use the software, the users need to take three digital photographs (front view, ¾ view, and lateral view) and open it in the software program. They also need to measure the three facial features manually. More details can be found in (Astley and Clarren 2001, Astley 2004).

Dalal et al in (Dalal and Phadke 2007) investigated geometric morphometrics to analyze the variation in faces of dysmorphic syndrome and normal individuals. Principal component analysis was applied to the landmark coordinates and discriminant analysis and binary logistic regression differentiated the two groups. No texture features were extracted and it also required manual landmark placement.

Besides 2D facial image analysis, 3D facial morphology was also investigated. One study (Aldridge, Boyadjiev et al. 2005) applied photogrammetry to 3D scans. Their results suggested that the anthropometric landmarks can be positioned reliably which is useful for clinical dysmorphology and surgery. Hammond et al in (Hammond, Hutton et al. 2004) used dense surface models to analyze 3D facial morphology. The models allowed for the visualization of 3D face shape variation. In (Wilamowska, Shapiro et al. 2009), the authors described a method for identification of 22q11.2 deletion syndrome using a set of labeled 3D meshes acquired from stereo imaging. But the image acquisition is complicated for 3D scanning. Few healthcare centers have access to 3D face scanning device, which also caused the small database for 3D face morphology.

Overall, the current diagnostic methods for syndromes associated with face dysmorphosis are complicated, time-consuming, and require a high degree of experience and expertise. Therefore, it is necessary and desirable to develop a simple, non-invasive, automated method of quantitative assessment of syndromes such as Down syndrome or others where the condition is related to facial morphology.

SUMMARY

Among other things, the present disclosure relates to computer-aided diagnosis in dysmorphology. Specifically, the present disclosure describes a computer-aided diagnosis and screening technique for automatic, non-invasive assessment of syndromes in dysmorphology using simple facial photographic data. An image analysis device according to the present disclosure improves diagnostic accuracy, allows for population screening and remote healthcare, and reduces diagnostic time and cost. Processing in accordance with the present disclosure also improves communication between clinicians, between clinicians and patients, and the management of patients with genetic syndromes. Moreover, the present disclosure may be adapted for assessment of other conditions associated with facial dysmorphosis, and generally assessing facial morphology or face recognition from basic images.

In one embodiment, an image analysis device includes circuitry configured to receive one or more input images and detect a plurality of anatomical landmarks on the one or more input images using a pre-determined face model. The circuitry is configured to extract a plurality of geometric and local texture features based on the plurality of anatomical landmarks. The circuitry is configured to select one or more condition-specific features based on the plurality of geometric and local texture features. The circuitry is configured to classify the one or more input images into one or more conditions based on the one or more condition-specific features.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1:
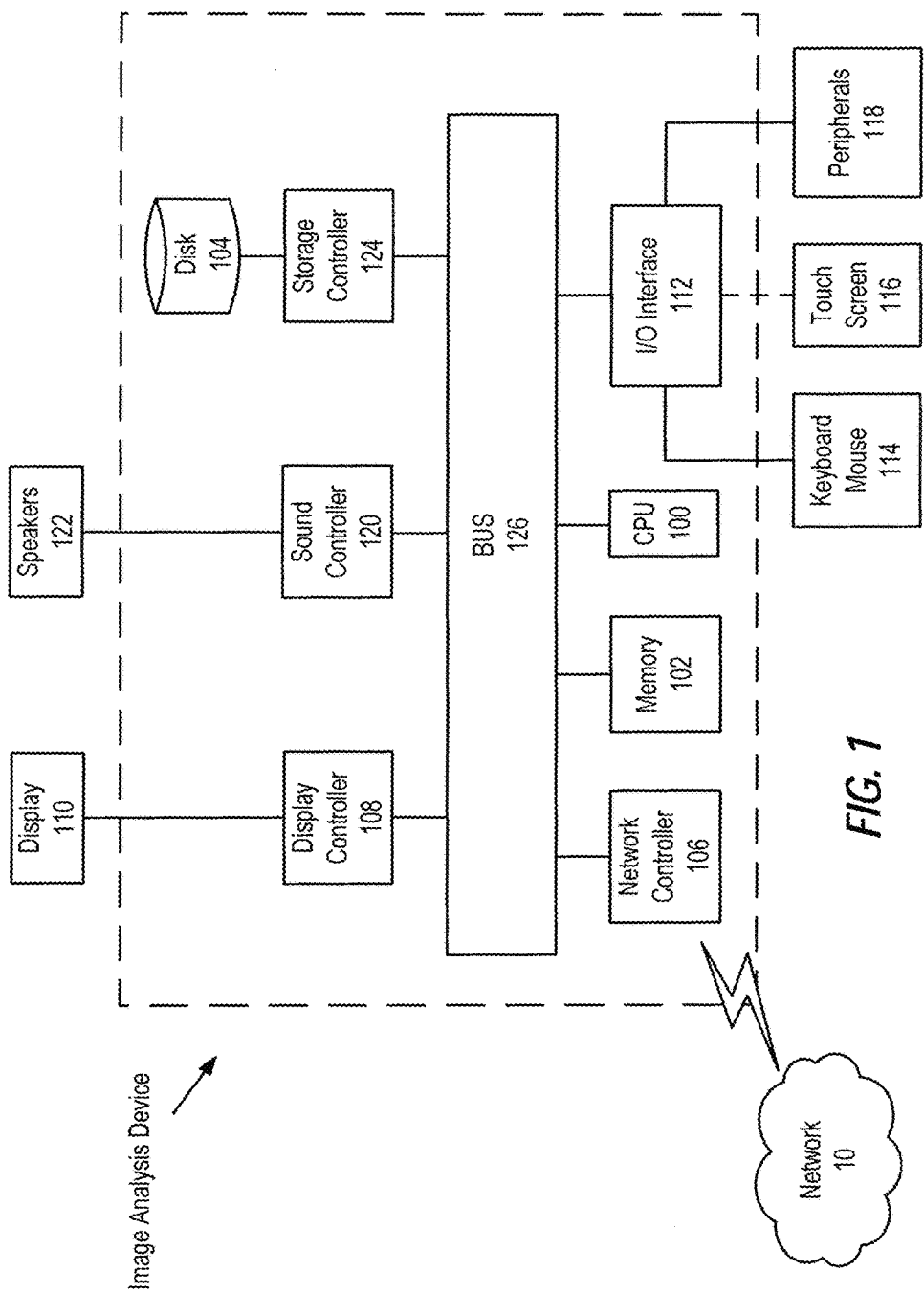
FIG. 1 illustrates an exemplary block diagram of an image analysis device, according to certain embodiments of the present disclosure.

Clinical diagnosis of dysmorphic syndromes needs a high degree of experience and expertise, which usually includes a physical examination and the evaluation of the overall impression of a patient by a clinician. Imprecise and non-standard nomenclature places a major difficulty for the communication between dysmrophologists and patients. In addition, the early diagnosis of syndromes may provide the best clinical management of patients for a lifelong medical care. Therefore, there is a need for an objective, fully automated and non-invasive clinical assessment tool for syndrome diagnosis in dysmorphology which can increase the diagnostic accuracy, improve communications between clinicians and patients, reduce time and expense, and allow for remote diagnosis.

The present disclosure provides a fully automated and non-invasive objective assessment and screening method for dysmorphic syndromes based on anatomical facial feature analysis and machine learning techniques.

One embodiment of the present disclosure includes the following attributes:

1) Fully automated procedures from patient's photograph input to diagnostic assessment to evaluation of outcome.

2) Adaptation to a wider variation in image quality that may include illumination, background, varied resolution, varied poses, etc.

3) Automated detection and placement of anatomical landmarks based on a constrained local model.

4) Proposal of using independent component analysis (ICA) in statistical shape models and a data-driven selection method for selecting independent components.

5) Proposal of shape prior estimation using kernel density estimation (KDE) and/or Gaussian mixture model (GMM).

6) A definition of geometric facial features derived from anatomical landmarks to characterize the facial morphology for syndrome patients and a healthy population.

7) Proposal of multi-scale local texture features based on local binary patterns (LBP) computed within a local region around each landmark, indicating clinical bases for each specific syndrome.

8) Combination of geometric and local texture features to represent both morphological and structural variation between syndrome patients and healthy group.

9) The ability to create quantitative assessment models for genetic syndrome detection, identify relevant facial characteristics to a specific syndrome, and potentially support remote diagnosis in areas without access to a genetic clinic.

10) Non-invasive assessment for multiple dysmorphic syndromes that is potentially helpful for population screening, early diagnosis and lifelong healthcare for patients.

11) Detection and screening of emotional and psychological states, such as happiness, pleasure, distress, disgust, anger, sadness, crying, pain, etc.

12) Surveillance of emotional and psychological states for clinical, social or security reasons.

13) Screening of emotional states for marketing research/assessment.

According to one embodiment, an image analysis device according to the present disclosure captures and/or receives basic photographs as input with varying illumination, backgrounds, resolution, as well as subjects with different ages, genders, ethnicities, poses, etc. It performs automated landmark placement based on a constrained local model which considers both shape and appearance information of face. The accurate placement of anatomical landmarks is the basis for the following steps. The shape models also allow for facial morphologic variation analysis between syndromes and a baseline population, with respect to health or emotional/psychological states.

Based on the anatomical landmarks, geometric and local texture descriptors may be extracted to characterize facial morphology and syndrome-specific textures, e.g., upward slanting eyes, flattened philtrum, length of nose, appearance of epicanthic folds, wrinkles, etc. The clinically relevant geometric features are defined by geometric relationships between and among landmarks and those interrelationships as opposed to simple landmark coordinates. The illumination invariant local texture features extracted around each landmark using size-variant windows have the ability to robustly discern micro-structures. The size-variant windows make the texture features robust against image resolution.

Furthermore, the present disclosure provides a methodology for developing a computer-aided screening and diagnosis system for dysmorphic syndromes based on typical facial morphological and textural characteristics of patients in different types of pathologies. The method also identifies the relevant facial characteristics to a specific syndrome and selects the informative features from a clinical point of view. With the combination of geometric and texture facial features, discriminative models are learned for each specific syndrome.

An image analysis device according to certain non-limiting exemplary embodiments of the present disclosure has the potential to impact the clinical practice of dysmorphology at the following aspects:

1) Help a pediatrician without dysmorphology expertise to identify a syndrome and refer to a specialist.
2) Aid a clinical specialist to point to an alternate syndrome out of their specialty.
3) Enable a dysmorphologist to make more rapid and accurate diagnosis.
4) Identify an underlying syndrome during an alternate condition warranting care.
5) Help move into screening and earlier diagnosis, allowing for earlier interventions on some of severe co-morbidities, and referral to specialized clinics.
6) Help detect and screen emotional and psychological states for clinical, social, marketing or security reasons.
7) Reduce the costs of genetic diagnosis.
8) Improve communication between clinicians, and between clinicians and patients.
9) Improve management of patients with genetic syndromes.

The present disclosure proposes a method of automated assessment for dysmorphic syndromes based on facial characteristics derived from two-dimensional photographs. In one embodiment, an image analysis according to the present disclosure includes automated face detection, landmark placement based on constrained local model, geometric and local texture feature extraction, syndrome/dysmorphology-specific feature selection, and discriminative model generation. From the shape model, variation of facial morphology between syndromes and a control group can be analyzed to assist in dysmorphology training, clinical diagnosis and multidisciplinary studies of phenotype-genotype correlations. The method is less sensitive to image quality, patient's age, gender and ethnicity, which makes remote diagnosis possible.

At least some embodiments of the present disclosure include:

Full automation ability: automation ability for input of a patient's facial photograph, face detection, landmark placement, feature extraction, and syndrome assessment.

Shape model: ICA-based shape model is built with both patients with syndrome and healthy group data. It provides the mean shape and the allowable shape variation. Before building the shape model, shape alignment is performed to remove the translation, rotation and scale effect among shapes. The independent components are selected using a data-driven selection method and the shape prior is estimated using either KDE or GMM.

Appearance patch model: patch model describes the appearance of a patch around each landmark using linear support vector machine coefficients. Again the patch model is built using both syndrome patients and healthy group photographs.

Automatic landmark detection: with the built shape and patch models, landmarks can be detected by local searching automatically. The optimal landmark locations are obtained by jointly optimizing appearance response functions and shape constraints. Multi-resolution search (from coarse to fine) is performed to achieve more efficient and robust landmark detection.

Geometric features: the clinical relevant geometric features are defined by geometric relationships between and among landmarks and those interrelationships. Geometric features include: normalized horizontal distance, normalized vertical distance, and corner angles. Geometric features characterize the facial morphology of dysmorphic syndromes, e.g. slanting eyes, small nose, small mouth, protruding tongue, etc.

Local texture features: the first-order statistics of a local binary pattern (LBP) histogram of the region around each landmark or the Gabor wavelet jet are used to describe local texture information. Local texture features are extracted using size-variant windows to achieve scale invariance. The discriminative power of LBP allows it to capture the micro-structures, e.g. wrinkle, shadow, flattened region, etc.

Feature fusion and selection: geometric features and local texture features are combined to fuse more information. The method identifies clinical relevant features to a specific syndrome and selects the most informative features. The combination of geometric and texture features describes both morphology and structure of face.

Diagnostic protocol: using the geometric and local texture features, discriminative models are built with, but not limited to one or more classifiers, such as support vector machines (SVM), k-nearest neighbor (kNN), linear discriminant analysis (LDA) and random forest to detect a specific syndrome. As a result, a simple, non-invasive, automated screening and diagnostic method for dysmorphology is achieved in one preferred embodiment of the present disclosure.

Validation: the present disclosure provides that:
1) The shape alignment allows for landmark detection and feature extraction with high precision.
2) The landmark detection has error normalized by distance between pupils 5.37%+/−1.15%.
3) Geometric features only detect Down syndrome with average accuracy, precision and recall for linear Support Vector Machines (SVM), 95.0%%, 95.1%, 90.7%, respectively.
4) Local texture features only predict Down syndrome with high accuracy, precision and recall, 93.4%, 94.9%, 86.0%, respectively.

5) Performance of the method improves when using combined features with 96.7% accuracy, 93.3% precision and 97.7% recall.
6) The diagnostic protocol optimally derived for Down syndrome as one embodiment with a diagnostic area under the receiver operating characteristic curve (AUC) of 0.99.
7) The selected relevant features agree with the clinical findings of specific syndrome.

Referring now to the drawings, wherein like reference numerals designate identical or corresponding parts throughout the several views.

Referring first to FIG. 1, a hardware description of an image analysis device according to exemplary embodiments is described with reference to FIG. 1. In FIG. 1, the image analysis device includes a CPU 100 which may be configured to perform the processes described herein. Process data and instructions may be stored in memory 102. These processes and instructions may also be stored on a storage medium disk 104 such as a hard drive (HDD) or portable storage medium, or may be stored remotely. Further, the claimed advancements are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the image analysis device communicates, such as a server or computer. Moreover, instructions and/or other data ((e.g., images, medical record data, criminal record data, etc.) related to processing described herein may be stored and/or executed remotely on one or more server devices accessible to one or more client devices operating on a network, such as in a cloud computing environment.

Further, the claimed advancements may be provided as a utility application, background daemon, or component of an operating system, or combination thereof, executing in conjunction with CPU 100 and an operating system such as Microsoft Windows 7, UNIX, Solaris, LINUX, Apple MAC-OS and other systems known to those skilled in the art.

CPU 100 may be a Xenon or Core processor from Intel of America or an Opteron processor from AMD of America, or may be other processor types that would be recognized by one of ordinary skill in the art. Alternatively, the CPU 100 may be implemented on an FPGA, ASIC, PLD or using discrete logic circuits, as one of ordinary skill in the art would recognize. Further, CPU 100 may be implemented as multiple processors cooperatively working in parallel to perform the instructions of the various processes described herein.

The image analysis device in FIG. 1 also includes a network controller 106, such as an Intel Ethernet PRO network interface card from Intel Corporation of America, for interfacing with network 10. As can be appreciated, the network 10 can be a public network, such as the Internet, or a private network such as an LAN or WAN network, or any combination thereof and can also include PSTN or ISDN sub-networks. The network 10 can also be wired, such as an Ethernet network, or can be wireless such as a cellular network including EDGE, 3G and 4G wireless cellular systems. The wireless network can also be Wi-Fi, Bluetooth, or any other wireless form of communication that is suitable for a transfer of image data and other related data.

The image analysis device further includes a display controller 108, such as a NVIDIA GeForce GTX or Quadro graphics adaptor from NVIDIA Corporation of America for interfacing with display 110, such as a Hewlett Packard HPL2445w LCD monitor. A general purpose I/O interface 112 interfaces with a keyboard and/or mouse 114 as well as a touch screen panel 116 on or separate from display 110. General purpose I/O interface also connects to a variety of peripherals 118 including printers and scanners, such as an OfficeJet or DeskJet from Hewlett Packard.

The peripherals 118 section may also include a moving and/or still image camera (e.g., a charge-coupled device or other image capturing device) to capture images, e.g., of one or more individuals' face(s). In certain embodiments, image data (e.g., individual face images) may be stored locally in the memory 102, whereby the individual images included in the image data may be processed individually or in bulk. For example, processes described herein may be implemented such individuals corresponding to a particular diagnosis are selected from a population (i.e., a group of individual images) of individuals. In certain embodiments, image data may also be received via the network 10, whereby any of the processes described herein can be performed on the received image data. For example, image data may be received from a mobile device such as a smartphone that includes instructions for implementing an application that captures image data and returns a diagnosis result based on processing according to the present disclosure.

A sound controller 120 may also be provided in the image analysis device, such as Sound Blaster X-Fi Titanium from Creative, to interface with speakers/microphone 122 thereby providing sounds and/or music.

The general purpose storage controller 124 connects the storage medium disk 104 with communication bus 126, which may be an ISA, EISA, VESA, PCI, or similar, for interconnecting all of the components of the image analysis device. A description of the general features and functionality of the display 110, keyboard and/or mouse 114, as well as the display controller 108, storage controller 124, network controller 106, sound controller 120, and general purpose I/O interface 112 is omitted herein for brevity as these features are known.

One of ordinary skill in the art will appreciate that the processing described herein may be implemented in hardware embodiments other than the above-described exemplary image analysis device. For example, aspects of the present disclosure may be implemented with a mobile device such as a tablet, a laptop computer, or a smartphone. Moreover, in certain embodiments, a combination of devices communicating on a network may be utilized in performing processing features according to the present disclosure. For example, image data may be captured with a mobile device that includes a wireless communication interface capable of transmitting the image data to a Web server. The image data may be analyzed with the Web server (or another client device connected to the server) according to processing described herein, and a result of the analysis may be returned to the mobile device.

Figure 2:
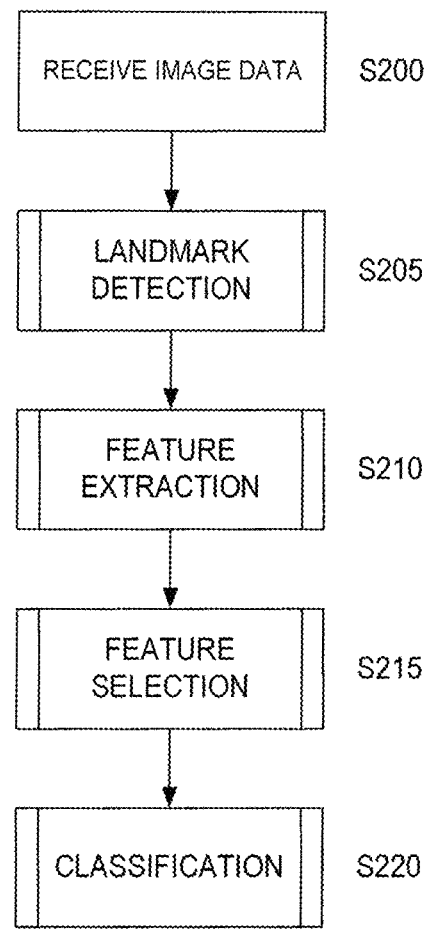
FIG. 2 illustrates an exemplary schematic framework of an image analysis and condition classification method, according to certain embodiments of the present disclosure.

Next, FIG. 2 illustrates an exemplary schematic framework of an image analysis and condition classification method, according to certain embodiments of the present disclosure. The process illustrated in FIG. 2 may be implemented by an image analysis device such as the device described above with respect to FIG. 1.

At step S200, the image analysis device receives one or more images as image data. The image data may be received in real-time or near real-time by capturing the images locally or receiving the images on a network, retrieving the images from memory, or receiving the images from another source. It is assumed that the received image data includes one or more images that include an individual's face. In certain embodiments, the image analysis device may perform an initial screening of received image data to determine whether the images included in the image data include an image area with a face image (e.g., by a basic facial recognition algorithm). An error may be output and/or an image may be excluded from subsequent analysis if the initial screening processing determines that an image does not include a face or another image feature.

After image data is received at step S200, the image analysis device proceeds to step S205, where the image analysis device performs a landmark detection process. In certain embodiments, the landmark detection process of step S205 includes locating and placing anatomical landmarks on the image data using an ICA-based constrained local model (CLM). An exemplary method of generating the ICA-based CLM for use in the landmark detection process will now be described with reference to FIG. 3A.

Figure 3A:
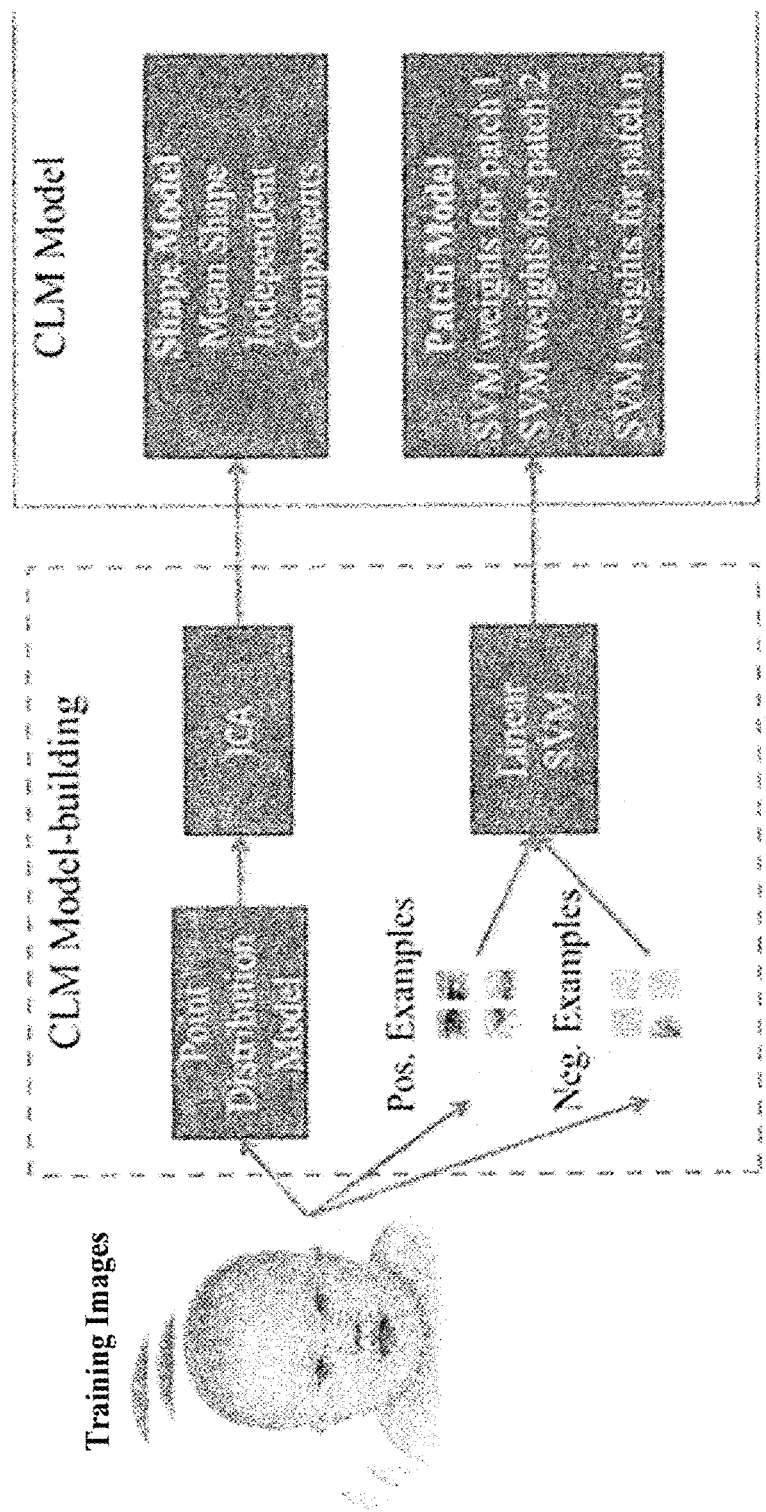
FIGS. 3A and 3B illustrate an exemplary schematic of a method for facial landmark detection with a constrained local model including model building and searching, according to certain embodiments of the present disclosure.

FIG. 3A shows an exemplary process of CLM generation, according to certain embodiments. This image acquisition and preparation process may be performed only once for generating a CLM for a given condition (e.g., a syndrome, emotional state, psychological state, etc.). In other words, a CLM generated in accordance with the present disclosure may then be implemented several times in a landmark detection process for a particular condition without the need to re-generate the CLM prior to each landmark detection process. Moreover, while the CLM generation process is described in the present example as part of the feature extraction process in step S205, the CLM generation process in other implementations may be performed in advance of the processing shown in FIG. 2. For example, a CLM may be generated for a particular condition in advance of receiving image data to be screened for the condition/syndrome at step S200.

Referring still to FIG. 3A, the inputs to the processing device for CLM generation are training images corresponding to basic facial photographs of both syndromes (or emotional states or other types of facial morphology) and a baseline group. In general, the baseline group relates to a population that does not have a condition being analyzed by the image analysis device. In the medical context, the baseline group may correspond to image data of a healthy population. In the context of analyzing emotional and psychological states, the baseline group may correspond to image data of individuals having some arbitrary neutral emotional/psychological state. It should be appreciated that while some examples described herein relate to the medical context and comparisons with a healthy group, such examples may be modified to include the more generic case of a baseline group.

To learn a reliable model, a large set of training images should be included in the processing (e.g., >100 subjects across any age and ethnicity, but numbers may vary with the application), but these images may be acquired only once when constructing the models. In one embodiment, the training images are annotated using 44 anatomical landmarks. However, the annotation of anatomical landmarks may differ based on, e.g., the condition being screened and/or desired precision and therefore, the number of landmarks annotated in this example is not limiting.

Figure 6:
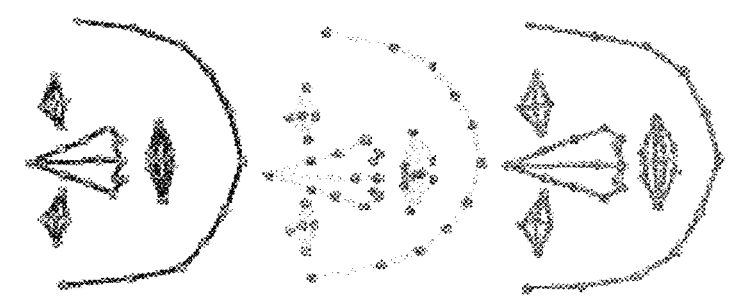
FIG. 6 illustrates an example of mean shape variation, according to certain embodiments of the present disclosure.
Figure 6:
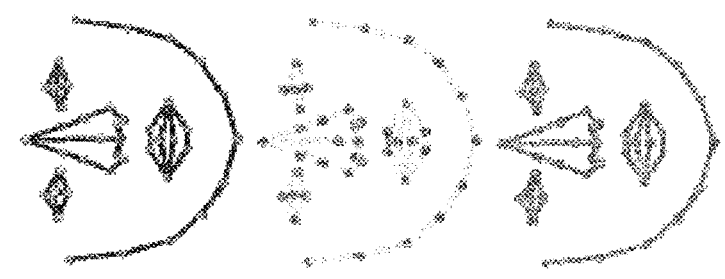
Figure 6:
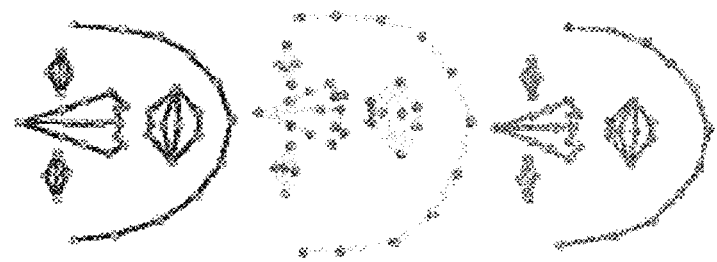
Figure 11:
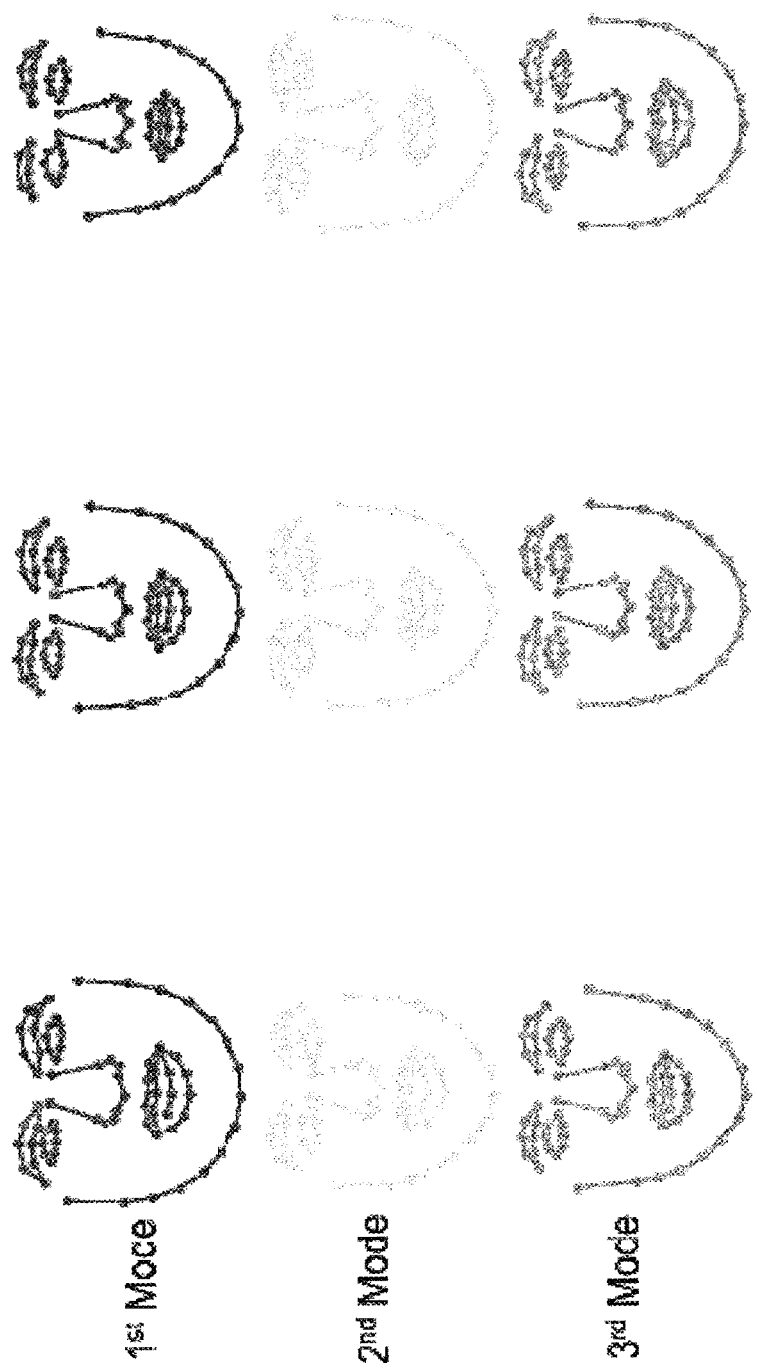
FIG. 11 illustrates exemplary shape variations of an emotional states dataset, according to certain embodiments of the present disclosure.
Figure 14A:
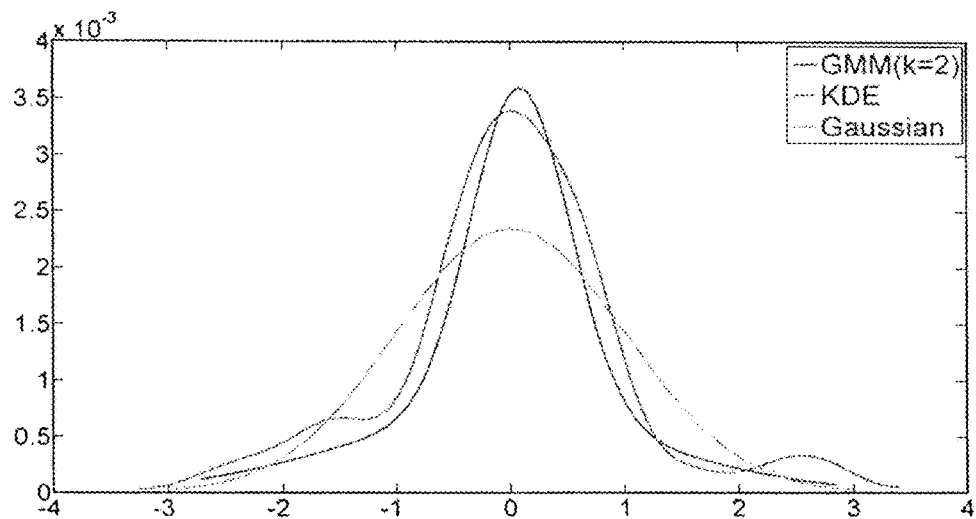
FIGS. 14A and 14B illustrate exemplary shape distributions of a talking video dataset estimated by kernel density estimation (KDE), Gaussian mixture model (GMM) (k=2) and Gaussian distribution for a first independent mode and a second independent mode obtained with independent component analysis (ICA), according to certain embodiments of the present disclosure.
Figure 14B:
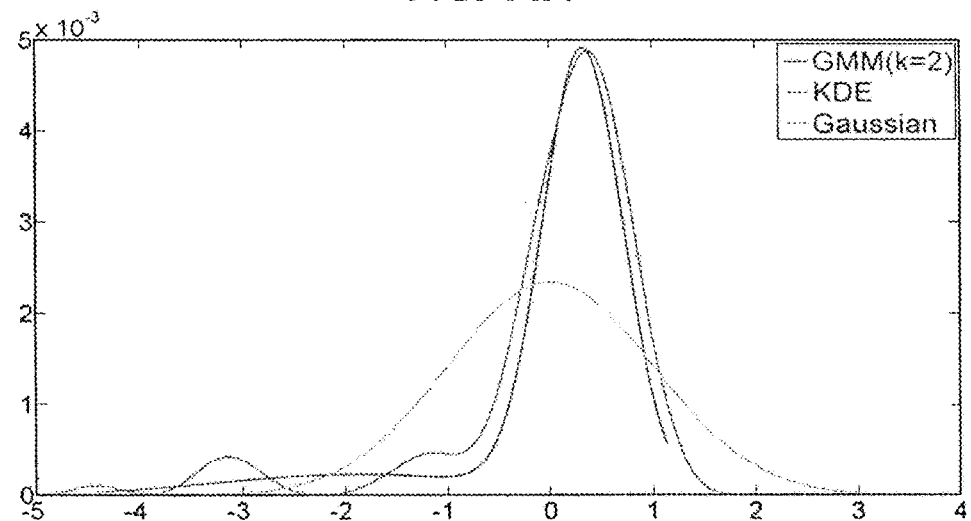

A statistical shape model and patch model are obtained during the CLM generation process. The shape model describes the face shape variation built with independent component analysis. It provides the allowable shape constraints by bounding independent modes with empirical shape variations. For the purposes of the present example, three independent modes may be utilized: the first independent mode may present the head pose up and down, the second independent mode may describe the head pose left and right, and the third independent mode may describe the mouth deformation (close to open). In one or more embodiments, greater or less than three independent modes may be utilized, based on the application. As an example of allowable shape constraints described by the CLM shape model in certain embodiments, FIG. 6 illustrates an exemplary shape variation using the first, second and third independent modes, where weights take values of negative width of histogram of shape parameters, zero and the positive width of histogram of shape parameters; FIG. 11 illustrates exemplary shape variations of an emotional states dataset for the first, second, and third independent modes, where weights take values of the negative width of histogram of shape parameters, zero and the position width of histogram of shape parameters; and FIGS. 14A and 14B illustrate exemplary prior distributions of shape parameters estimated from the training samples of talking video dataset estimated by KDE, GMM (k=2) and Gaussian for the first independent mode (FIG. 14A) and the second independent mode (FIG. 14B) obtained with ICA.

Figure 7:
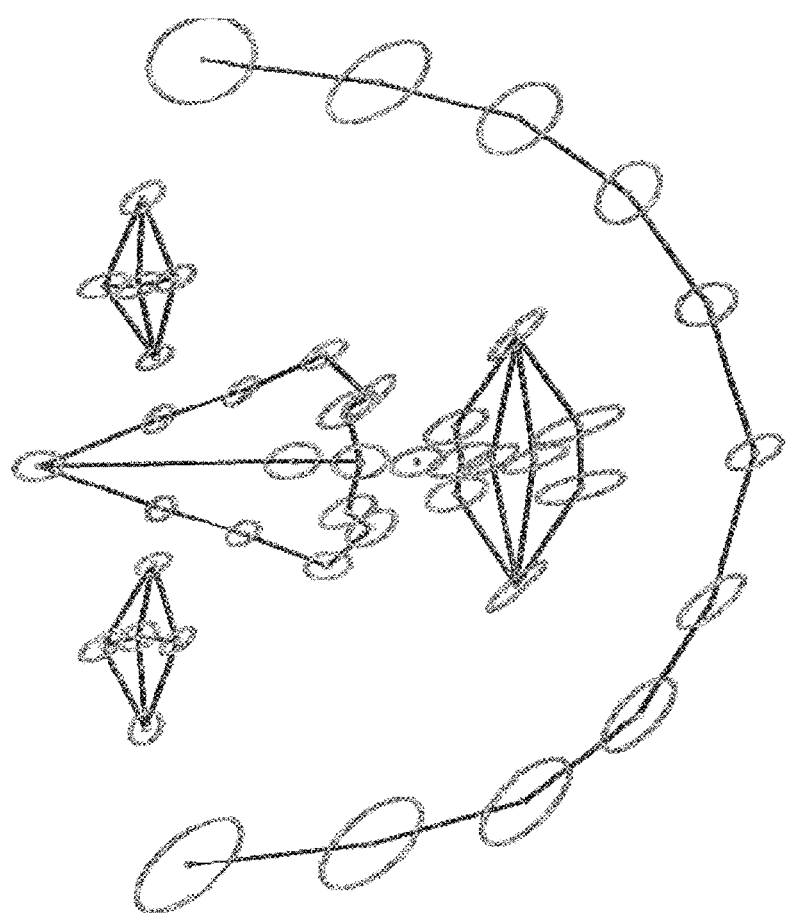
FIG. 7 illustrates an example of statistical point distribution of training data including Down syndrome and healthy populations shown by mean (points) and standard deviation (ellipses), according to certain embodiments of the present disclosure.
Figure 8:
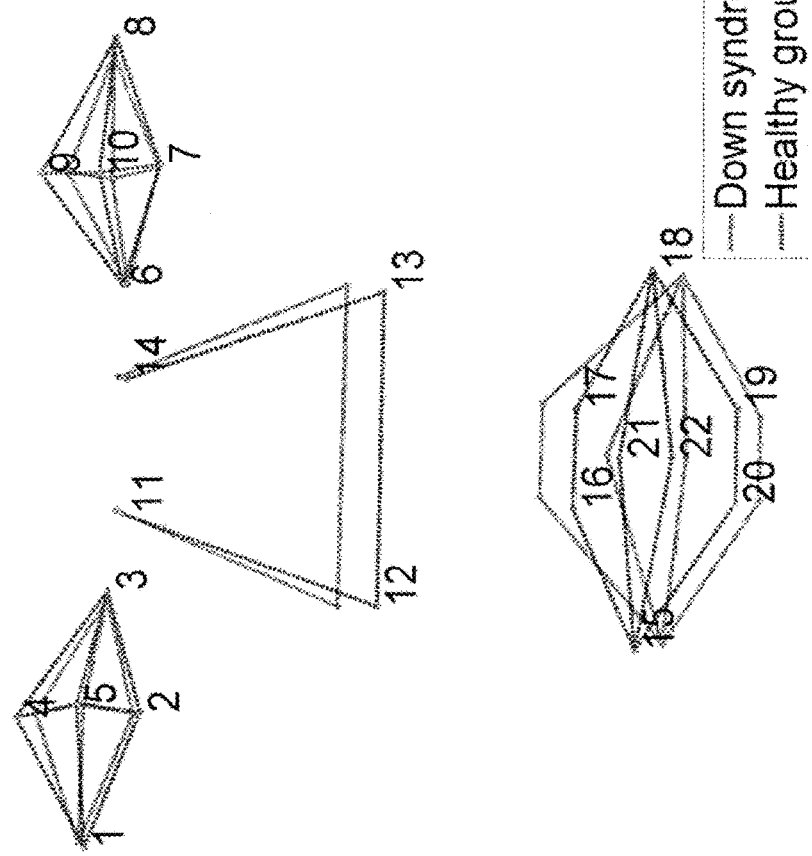
FIG. 8 illustrates an exemplary mean shape comparison between Down syndrome (solid lines) and healthy group (broken lines), according to certain embodiments of the present disclosure.

In certain embodiments, the distribution of shapes in the shape space may be modeled as a non-Gaussian distribution using either kernel density estimation or Gaussian mixture models. Accordingly, the shape parameters are limited by the empirical width of histogram of shape parameters which describes 99.7% of the shapes. The variances of independent components are ordered from largest to smallest using a data-driven method. The first three independent modes show the first three largest shape deformations. The point distribution variation of the training data (shown in FIG. 7) is large for the dataset used in this example, indicating the variation between the syndrome group (or some general condition) and healthy/baseline group. Applying data corresponding to Down syndrome and a healthy/baseline group as an example, a comparison of the statistical mean shape between the Down syndrome and healthy/baseline group (shown in FIG. 8) agrees with clinical findings of Down syndrome (e.g. small nose and protruding tongue).

As mentioned previously, the CLM generated in accordance with the present disclosure may include a shape model, which is described in detail above, and a patch model. Regarding the patch model, the patch model included in the CLM represents the appearance of each facial feature (e.g. eyes, nose, mouth, etc.). The shape and patch models together capture both face morphology and texture information. As demonstrated herein and described later in detail, screening and diagnosis based on image analysis processing with the combination of morphology and texture features according to the present disclosure increases detection rate performance relative to the performance of conventional techniques and/or processing relying upon only one group of these features.

Figure 10:
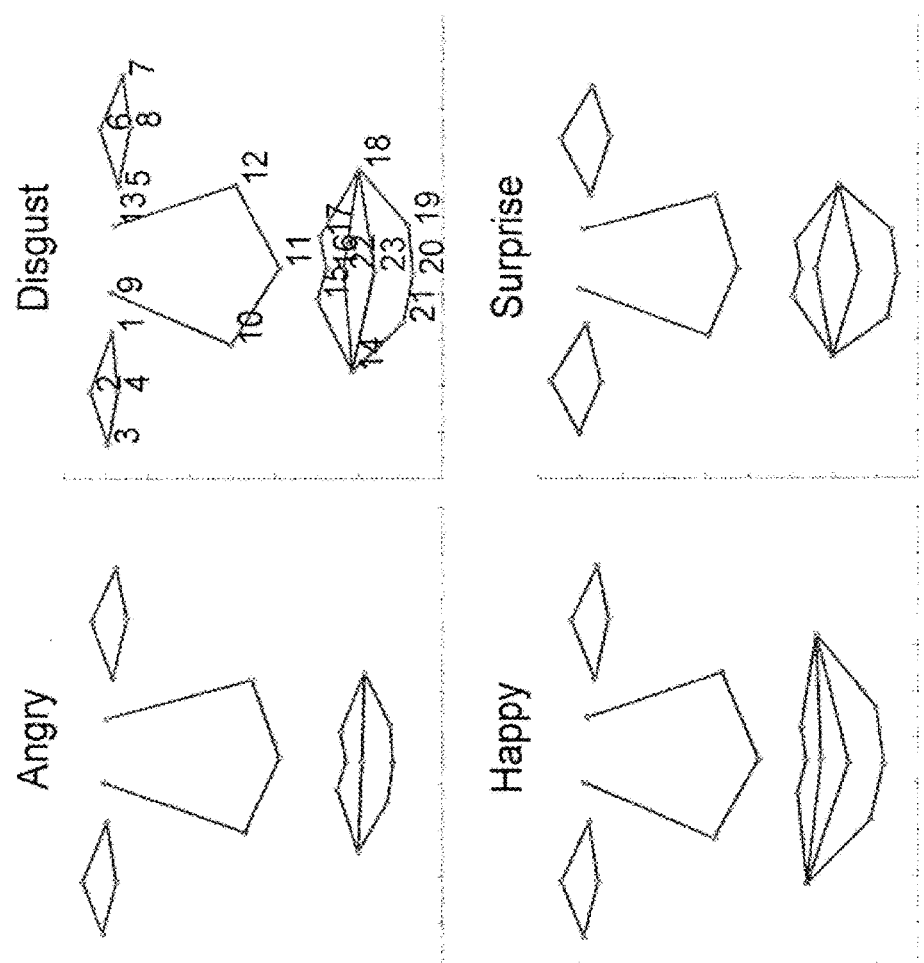
FIG. 10 illustrates an exemplary mean shape comparison among four emotional states, according to certain embodiments.
Figure 12:
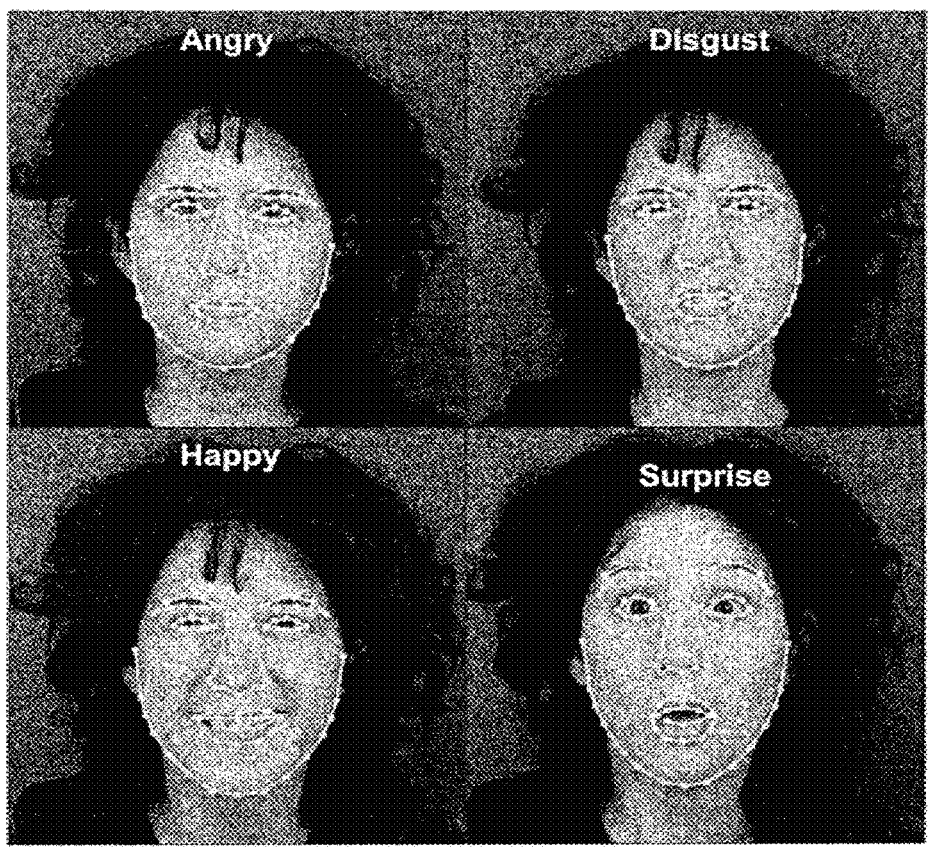
FIG. 12 illustrates exemplary instances of emotional states with detected facial landmarks, according to certain embodiments of the present disclosure.
Figure 13:
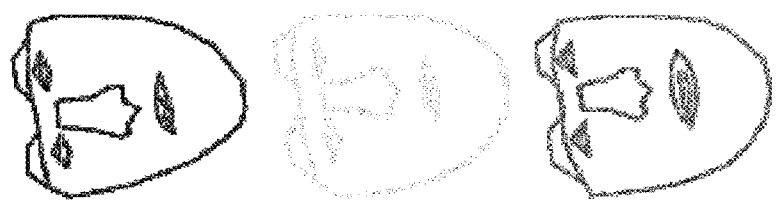
FIG. 13 illustrates exemplary shape variations of a talking video dataset, according to certain embodiments of the present disclosure.
Figure 13:
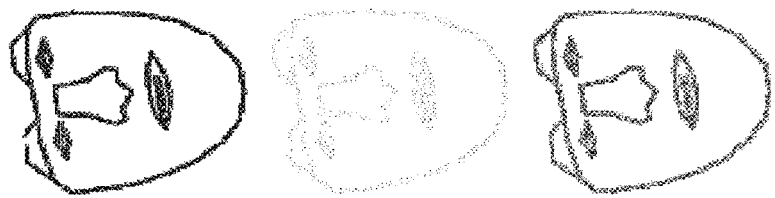
Figure 13:
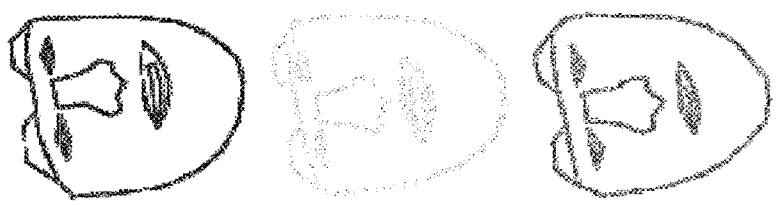
Figure 15:
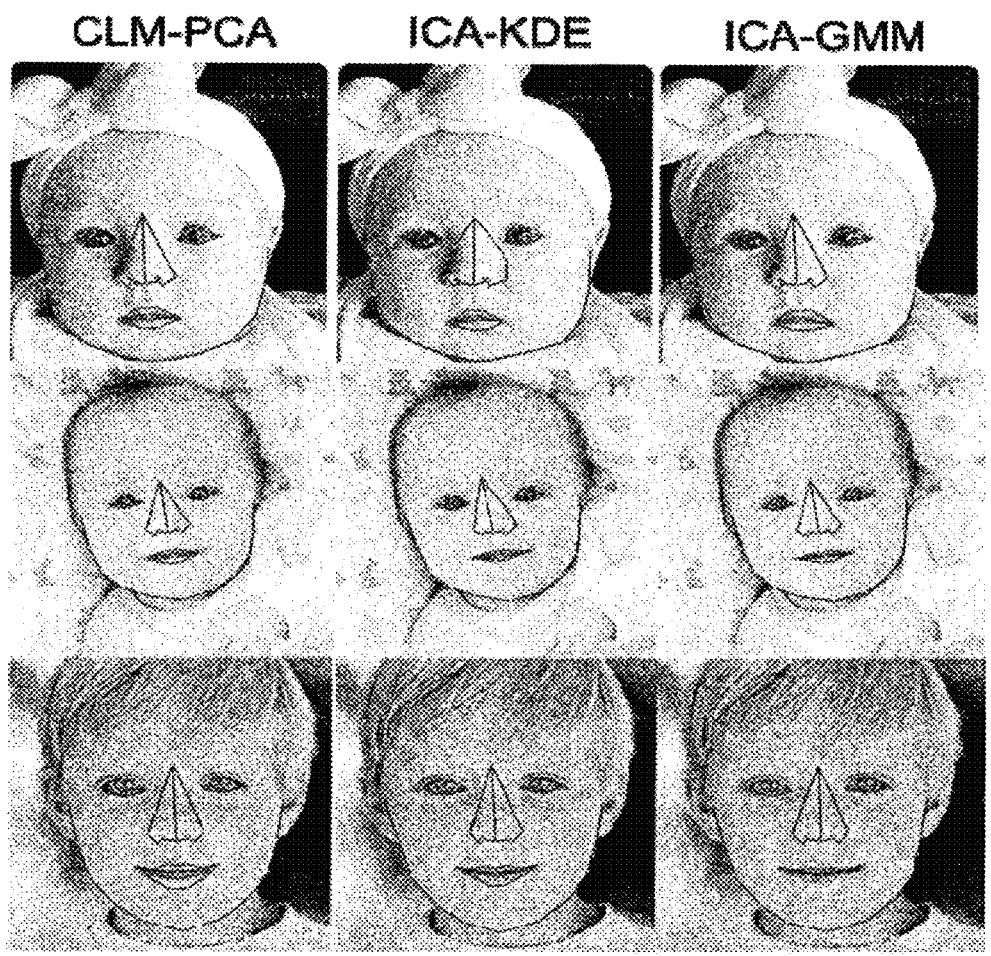
FIG. 15 illustrates an exemplary comparison of performance by using constrained local model (CLM) with principal component analysis (PCA) CLM-PCA, CLM-ICA-KDE and CLM-ICA-GMM, according to certain embodiments of the present disclosure.

Moreover, the image analysis processing based on geometric and texture features can also apply to detection/screening of emotional states and surveillance of emotional and psychological states for clinical, social, marketing or security reasons. Such variations in implementations may be accomplished by modifying the training data utilized for CLM generation according to the desired condition for detection. In an exemplary CLM generation process related to emotional and psychological state, the mean shapes of four emotional states (anger, disgust, happiness and surprise) are shown in FIG. 10 with instances in FIG. 12. The estimations of shape priors using Gaussian, KDE and GMM are compared in FIGS. 14A and 14B, where the shape priors show a highly non-Gaussian distribution. Feature detection performances of PCA-CLM, ICA-CLM-KDE and ICA-CLM-GMM are compared in FIG. 15.

As mentioned above, the CLM models generated in accordance with the present disclosure may be applied in the landmark detection process of step S205 shown in FIG. 2. An exemplary landmark detection process that utilizes the generated CLM will now be described with respect to FIG. 3B.

Figure 3B:
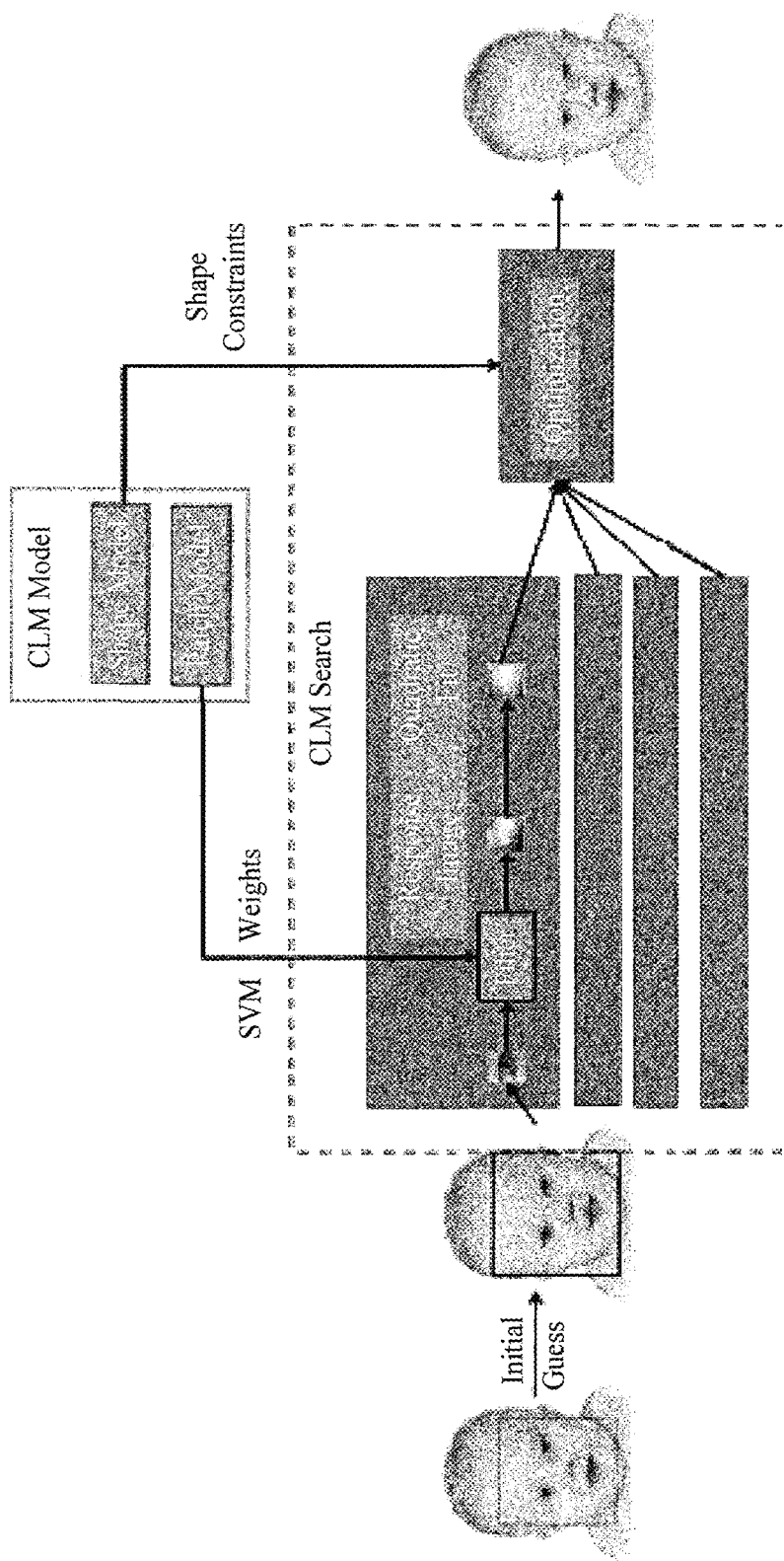

Referring to FIG. 3B, in a non-limiting exemplary CLM searching process, a face region in a received image is automatically detected and cropped. Facial features (e.g., eyes, tip of nose and corners of mouth) are also detected for search initialization, and an initial guess is made as to where the landmarks are located on the received image. In certain embodiments, the initial guess may be made based on landmark locations in an average face. The remaining processing described in detail below is focused on applying the constraints of the CLM generated from the training data such that the landmarks in the initial guess are altered to optimally fit the model.

Using the landmarks in the initial guess, a patch is centered on each landmark. The patch is then applied to a filter, which is a statistical model of what the patch should look like. In certain embodiments, the appearance of the patch is described by linear support vector machine (SVM) coefficients/weights from the patch model, which results in a response image. The response image of the linear support vector machine is estimated using KDE. The statistical model of the patch (i.e., the response image) is then fit and optimized with respect to the constraints of the CLM. The independent components of the ICA-based shape model are selected using a data-driven method. The optimal landmark positions are obtained by jointly optimizing appearance response functions and shape constraints included in the shape model. Multi-resolution search is performed, from coarse to fine (general to specific), to achieve more efficient and robust searching. That is, the landmark detection based on the CLM may be performed in a hierarchical fashion. The hierarchical nature of the processing may relate to multiple aspects of image analysis. For example, the landmark detection process may first be applied to an entire face and then subsequently applied to detecting landmarks on the inner face (i.e., eyes, nose and mouth). As another example, the processing may be initially performed based by applying models from the general population (with and without the relevant condition) and then at subsequent processing levels, the landmark detection process may fit the closest model to the face. The hierarchical features of the processing according to the present disclosure helps improve landmark detection by accounting for the large variations of faces that may be received as an input.

Figure 4:
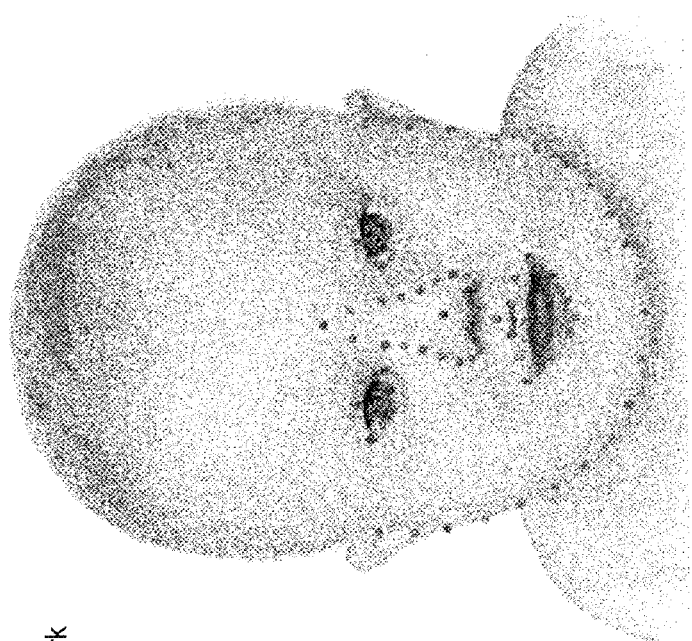
FIG. 4 illustrates an example of facial landmarks, according to certain embodiments of the present disclosure.

The result of the processing of FIG. 3B is an image including the detected anatomical landmarks, which is illustrated in FIG. 4. The above process may then be repeated for a new received image from a plurality of images corresponding to a population being screened.

To reduce the landmark detection error, pseudo-landmarks may be added to the image generated in the above landmark detection process. In the example of FIG. 4, 37 more pseudo-landmarks are added by interpolation between the 44 detected anatomical landmarks. The quantity of pseudo landmarks (and anatomical landmarks) may be selected such that suitable fidelity is achieved for a given implementation, while also accounting for trade-offs in terms of processing efficiency with respect to the number of detected and interpolated landmarks.

Figure 5:
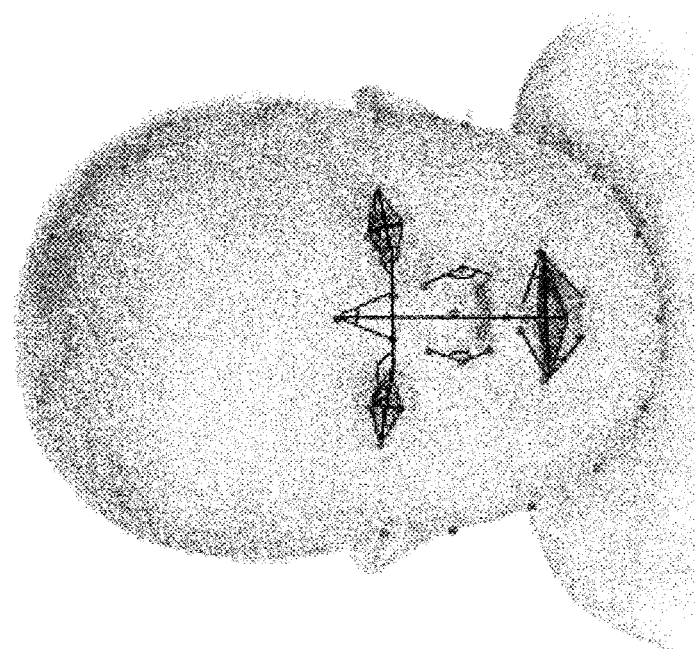
FIG. 5 illustrates an example of geometric features (lines and angles that connect points) containing normalized horizontal distances, vertical distances and corner angles between landmarks, according to certain embodiments of the present disclosure.

Referring back to FIG. 2, based on the results of the landmark detection process performed at step S205, a feature extraction process is performed by the image analysis device at step S210. An exemplary feature extraction process will now be discussed with reference to FIG. 5, which illustrates geometric features (lines and angles that connect points) containing normalized horizontal distances and corner angles between landmarks.

Syndromes present both special morphology (e.g., upward slanting eyes, small nose and mouth) and textures (e.g., flattened philtrum and appearance of epicanthic folds). Accordingly, to describe these two types of information, the image analysis device at step S210 extracts geometric and texture features on an aligned image which is registered to a reference image to remove the translation and in-plane rotation. Geometric features are defined via interrelationships between and among anatomical landmarks including more clinical bases that morphologists suggest for each specific syndrome. Geometric features may include normalized horizontal distances, normalized vertical distances, and corner angles between landmarks (shown in FIG. 5). For example, the geometric features may describe the slanting of the eyes, the width of the bridge of the nose, the length of the bridge of the nose, the opening of the mouth, etc. In certain embodiments, the distances may be normalized based on a distance between pupils.

To characterize syndrome-specific textures, multi-scale local texture features (e.g., changes in lines, shadows, creases, etc.) are also extracted on a local region around each landmark detected (or interpolated) from step S205. As an example of local texture feature extraction, landmarks corresponding to the philtrum may be analyzed to determine whether an individual's philtrum is flattened relative to a healthy/baseline population (e.g., by determining that the lack of texture corresponding to shadowing and lines in this area is consistent with a flattened philtrum). As another example, the extraction of local texture features and related image analysis may describe the prominence of an individual's epicanthic fold in the eye area. In this regard, shadowing near the eye and other image features indicating a prominent epicanthic fold may be indicative of a patient with Down syndrome. Such image analysis is very difficult to represent using only geometric features, thereby making classification of a condition less effective. In detecting local texture features, first-order statistics may be employed to describe a local binary pattern histogram and/or Gabor wavelet jet conveying texture information of micro-structure. Detected multi-scale local texture features representing syndrome-specific facial characteristics may then be applied in combination with the detected geometric features in subsequent steps. As demonstrated herein, the combination of geometric and texture features has demonstrated significant improvements with respect to previous methods.

Referring back to FIG. 2, at step S215 the image analysis device performs a feature selection process based on the results of the feature extraction at step S210. The combination of geometric features (global information) and local texture features (local information) characterize facial morphology and structure simultaneously. Feature selection via an area under the receiver operating characteristic (ROC) curve and the random classifier slope extracts informative and syndrome-specific features as well as reduces the high dimension of features.

In certain embodiments, machine learning techniques may be applied in the feature selection process to identify the features that are redundant or the features that are of importance/significance in classifying a particular condition.

For example, machine learning techniques may be applied to a multitude of features identified for a given condition (e.g., approximately 170 features were identified in image analysis related to Down syndrome in one implementation) in order to select, from the large set of features, a smaller number of features (e.g., 10 of the 170 features were selected in the Down syndrome case) that can statistically designate a given condition with optimal accuracy. By analyzing the ROC output, the image analysis device may determine whether detection rate performance improves or not based on the inclusion of a given feature (or combination of features) in the analysis. Thus, by selecting an optimal combination of statistical variables that result in classification performance above a predetermined desired threshold, processing efficiency can be greatly improved while maintaining optimal performance and accuracy.

Figure 9:
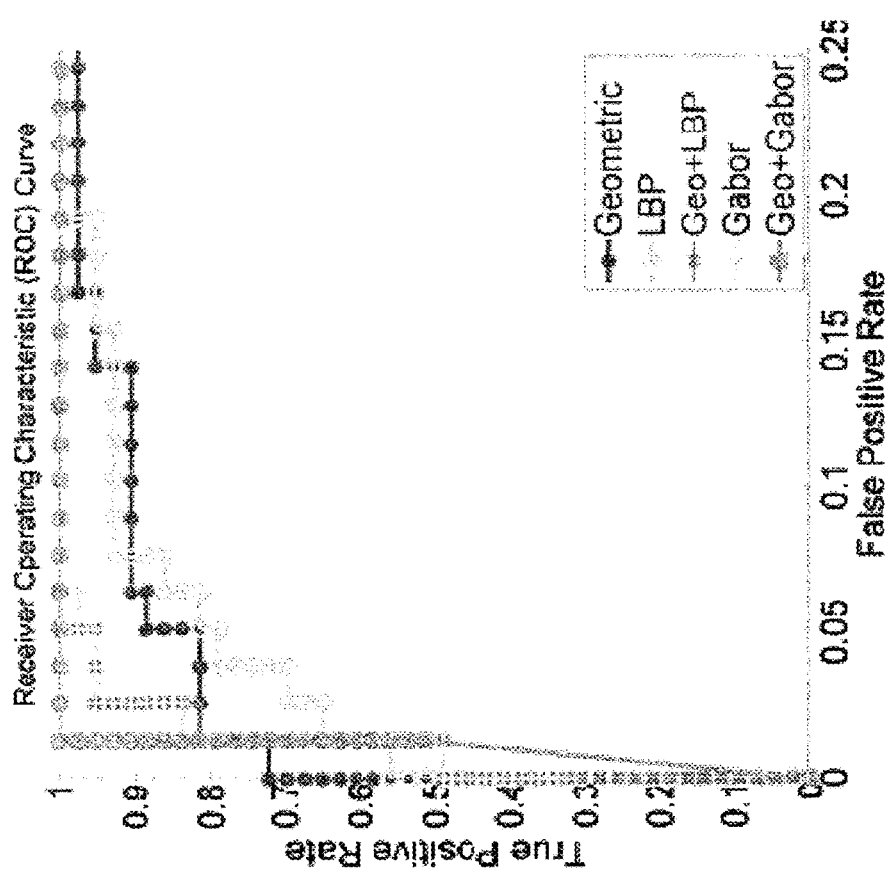
FIG. 9 illustrates an exemplary Receiver Operation Characteristic (ROC) curve of a support vector machine with radial basis function kernel classifier for geometric (line with points), local texture (line with circles) and combined features (line with x marks)

Next, at step S220, the image analysis device performs a classification process based on the feature selection result from step S215. In this step, a supervised learning scheme is utilized to analyze features selected by the previous steps and to classify the syndromes from baseline cases. For example, based on an analysis of a received image with respect to the features identified from the feature selection process, a probability score may be calculated for the received image representing a likelihood that the patient has a given condition. The probability score may be compared to a predetermined threshold, and a binary result (e.g., a positive or negative indication that the patient's facial features indicate a given condition at some degree of statistical significance) may be output based on the comparison. Several famous and effective classifiers may be employed including support vector machine with radial basis function kernel and linear kernel, k-nearest neighbor, linear discriminant analysis and random forests, etc. The cross-validation validation, such as leave-one-out validation, is performed to compare the geometric, local texture and combined features. FIG. 9 shows the ROC curve for a support vector machine with radial basis function kernel classifier. The largest area under the ROC curve (AUC) was achieved by the combined features. The predication by the classifiers can assist in assessment for syndromes in a fast, automatic and non-invasive way.

In certain embodiments, the image analysis device according to the present disclosure may output a recommended course of action based on the classification result. For example, in the context of screening for genetic syndromes, a recommendation for a particular medical practitioner may be output when the classification result indicates the patient likely has a given condition/syndrome, and suggestions for condition/syndrome management may be offered. In certain embodiments, condition management features may include lifestyle management information such as reminders/recommendations for treatment/appointments, weight control recommendations (e.g., dietary control recommendations, exercise recommendations, etc.), stress management recommendations, medication recommendations, etc. In one or more embodiments, an image analysis device according to the present disclosure may interface with a mobile health (mHealth) application and/or provide recommendations for mHealth applications related to a condition/syndrome.

In one or more embodiments, aspects of the present disclosure may be implemented to screen for emotional and psychological state (e.g., at security checkpoints or a clinical/psychological evaluation), and a recommendation to security personnel (e.g., conduct further security screening) may be output based on the classification result. As another example, aspects of the present disclosure may be implemented in a marketing analysis system, whereby a recommendation to advertise a particular product or service may be output based on the classification result.

The above processing is described in the context of performing image analysis with respect to front-view images that include a facial region corresponding to an individual. However, the processing described herein may be implemented based on images other than front-view facial images, or a combination of front-view and side-view images. For example, in one embodiment, side-view photographs of individuals with syndromes and a healthy/baseline population are alternatively or additionally employed. The lateral view provides additional information to frontal photographs (e.g. shape of ears, profile of face and nose) which is also important to syndrome diagnosis in clinical practice.

In one or more embodiments, processing described herein may be adapted to receive non-image data relating to an individual in addition to the image data related to the individual. For example, an image analysis device according to the present disclosure may perform classifications based on image data, as well as non-image data from a medical record, test results, family history, criminal record, etc. This additional non-image data may, e.g., be associated with the received image data, and the combination of image data and non-image data may be stored in memory such that some or all of the stored data may be retrieved for classification processing in accordance with the present disclosure. In certain embodiments, the additional data may be received as an input from an electronic medical record interface or another user interface.

Obviously, numerous modifications and variations of the present disclosure are possible in light of the above teachings. It is therefore to be understood that within the scope of the appended claims, the invention may be practiced otherwise than as specifically described herein. For example, advantageous results may be achieved if the steps of the disclosed techniques were performed in a different sequence, if components in the disclosed systems were combined in a different manner, or if the components were replaced or supplemented by other components. The functions, processes and algorithms described herein may be performed in hardware or software executed by hardware, including computer processors and/or programmable processing circuits configured to execute program code and/or computer instructions to execute the functions, processes and algorithms described herein. A processing circuit includes a programmed processor, as a processor includes circuitry. A processing circuit also includes devices such as an application specific integrated circuit (ASIC) and conventional circuit components arranged to perform the recited functions.

The functions and features described herein may also be executed by various distributed components of a system. For example, one or more processors may execute these system functions, wherein the processors are distributed across multiple components communicating in a network. The distributed components may include one or more client and/or server machines, in addition to various human interface and/or communication devices (e.g., display monitors, smart phones, tablets, personal digital assistants (PDAs)). The network may be a private network, such as a LAN or WAN, or may be a public network, such as the Internet. Input to the system may be received via direct user input and/or received remotely either in real-time or as a batch process. Additionally, some implementations may be performed on modules or hardware not identical to those described. Accordingly, other implementations are within the scope that may be claimed.

It must be noted that, as used in the specification and the appended claims, the singular forms "a," "an," and "the" include plural referents unless the context clearly dictates otherwise.

The invention claimed is:

1. A device comprising:
   circuitry configured to:
   receive one or more input images;
   detect a plurality of anatomical landmarks on the one or more input images using a pre-determined face model, by generating a statistical shape with non-Gaussian shape prior estimation using kernel density estimation (KDE) and/or Gaussian mixture model (GMM);
   extract a plurality of geometric and local texture features based on the plurality of anatomical landmarks;
   select one or more features from the plurality of geometric and local texture features; and
   determine a likelihood that a patient in the one or more input images has a genetic disorder based on the selected one or more features.

2. The device of claim 1, wherein
   the one or more features are syndrome-specific, age-specific, or ethnicity-specific features corresponding to genetic disorders.

3. The device of claim 1, wherein
   the circuitry is further configured to generate the pre-determined face model by being further configured to:
   receive a plurality of training images corresponding to a facial morphology and a texture of a baseline group and a group having at least one of the one or more features;
   further generate a statistical shape model and generate an appearance patch model based on the plurality of training images; and
   train a classifier with one or more geometric and multi-scale local texture features based on the plurality of training images, the statistical shape model, and the appearance patch model.

4. The device of claim 3, wherein
   the plurality of training images include image areas with individuals of different ages, genders, ethnicities, races, illumination, image background, resolution, or poses.

5. The device of claim 1, wherein
   the pre-determined face model is based on a constrained local model.

6. The device of claim 1, wherein the circuitry is configured to
   determine that the patient has the genetic disorder based on a machine learning technique.

7. The device of claim 1, wherein the circuitry is configured to
   select the one or more features based on an area between a receiver operating characteristic curve and a random classifier slope.

8. The device of claim 1, wherein
   the circuitry is configured to output a recommendation of a medical practitioner when the patient is determined to have the genetic disorder.

9. The device of claim 1, wherein
   the circuitry is configured to output a condition management recommendation when the patient is determined to have the genetic disorder.

10. The device of claim 9, wherein
    the condition management recommendation includes a recommendation for treating the genetic disorder.

11. The device of claim 9, wherein
    the condition management recommendation includes lifestyle management information related to the genetic disorder.

12. The device of claim 11, wherein
    the lifestyle management information includes at least one of a recommendation and a reminder related to diet and/or exercise.

13. The device of claim 11, wherein
    the lifestyle management information includes at least one of a recommendation and a reminder related to scheduling and/or attending an appointment related to treating the genetic disorder.

14. The device of claim 1, wherein the circuitry is configured to determine the likelihood based only on the selected one or more features.

15. The device of claim 1, wherein the pre-determined face model is generated by the circuitry being configured to
    perform independent component analysis (ICA) to generate a statistical shape face model via data-driven selection that selects independent components, and
    perform shape prior estimation using the kernel density estimation (KDE) and the Gaussian mixture model (GMM).

16. The device of claim 1, wherein
    the pre-determined face model is generated by the circuitry being configured to generate the statistical shape with the non-Gaussian shape prior estimation, and
    the circuitry is configured to generate the statistical shape with the non-Gaussian shape prior estimation using the kernel density estimation (KDE).

17. The device of claim 1, wherein the circuitry is configured to generate the statistical shape with the non-Gaussian shape prior estimation using the kernel density estimation (KDE) and the Gaussian mixture model (GMM).

18. The device of claim 1, wherein the pre-determined face model is generated by the circuitry being configured to perform independent component analysis (ICA) to generate a statistical shape face model.

19. The device of claim 1, wherein the pre-determined face model is generated by the circuitry being configured to perform, data-driven selection that selects independent components to generate a statistical shape face model.

20. The device of claim 1, wherein the circuitry is further configured to control display of an app interface which implements obtaining of the one or more input images.

21. The device of claim 1, wherein the circuitry is further configured to control display of an app interface which displays a result of a determination that the patient has the genetic disorder.

22. The device of claim 1, wherein
    the one or more input images correspond to a part of a body of the patient.

23. The device of claim 1, wherein the circuitry is configured to
    determine a probability score representing the likelihood that the patient in the one or more input images has the genetic disorder; and
    determine that the patient has the genetic disorder when the probability score is greater than or equal to a predetermined threshold and determine that the patient does not have the genetic disorder when the probability score is less than the predetermined threshold.

24. The device of claim 1, wherein the circuitry is configured to display, on a display, the likelihood that the patient in the one or more input images has the genetic disorder to allow a physician to determine whether the patient has the genetic disorder based on the likelihood and other information corresponding to the patient.

25. A method comprising:

receiving one or more input images;

detecting, by circuitry, a plurality of anatomical landmarks on the one or more input images using a pre-determined face model, the detecting including generating a statistical shape with non-Gaussian shape prior estimation using kernel density estimation (KDE) and/or Gaussian mixture model (GMM);

extracting, by the circuitry, a plurality of geometric and local texture features based on the plurality of anatomical landmarks;

selecting, by the circuitry, one or more features from the plurality of geometric and local texture features; and determining, by the circuitry, a likelihood that a patient in the one or more input images has a genetic disorder based on the selected one or more features.

26. A non-transitory computer readable medium having instructions stored therein that when executed by one or more processors cause a computer to perform a method comprising:

receiving one or more input images;

detecting a plurality of anatomical landmarks on the one or more input images using a pre-determined face model, the detecting including generating a statistical shape with non-Gaussian shape prior estimation using kernel density estimation (KDE) and/or Gaussian mixture model (GMM);

extracting a plurality of geometric and local texture features based on the plurality of anatomical landmarks;

selecting one or more features from the plurality of geometric and local texture features; and determining a likelihood that a patient in the one or more input images has a genetic disorder based on the selected one or more features.

27. A system comprising:

circuitry configured to:

receive one or more input images;

detect a plurality of anatomical landmarks on the one or more input images using a pre-determined face model, by generating a statistical shape with non-Gaussian shape prior estimation using kernel density estimation (KDE) and/or Gaussian mixture model (GMM);

extract a plurality of geometric and local texture features based on the plurality of anatomical landmarks;

select one or more features from the plurality of geometric and local texture features; and determine a likelihood that a patient in the one or more input images has a genetic disorder based on the selected one or more features; and a device that captures the one or more input images and transmits the one or more input images to the circuitry.

* * * * *